Patented Oct. 13, 1942

2,298,726

UNITED STATES PATENT OFFICE 2,298,726

AGE RESISTER FOR RUBBER

Winfield Scott, Akron, Ohio, assignor to Wingfoot Corporation, Wilmington, Del., a corporation of Delaware No Drawing. Application September 5, 1940, Serial No. 355,459

6 Claims. (Cl. 260—799)

This invention relates to the treatment of rubber to improve its resistance to ageing and more particularly to the use of materials resulting from the interaction of ketones and aryl amides.

Rubber ordinarily undergoes a process of deterioration with the passage of time, this deterioration being caused or accelerated by oxygen, light, heat, flexing, etc. Numerous materials are known which prevent or retard this deterioration, such materials commonly being designated as antioxidants or age resisters. The use of a particular age resistor depends largely upon the specific effect of the material in inhibiting the breakdown of rubber.

According to the present invention, it has been discovered that excellent age resisters for rubber, which are particularly effective at higher temperatures such as those encountered in the treads of tires during operation, may be obtained by condensing an aryl amide with a ketone, preferably in the presence of an acidic condensation catalyst. The practice of the invention is illustrated by the following examples.

EXAMPLE 1

One hundred grams (0.826 mol) of formanilid and 300 grams (5.17 mols) of acetone, with 4 grams of iodine as a catalyst, were reacted in an autoclave for 8 hours at approximately 225° C. The water, excess acetone and any other volatile ingredients of the crude product were removed by distillation at atmospheric pressure followed by heating under reduced pressure to 200° C., leaving the final product in the form of a dark, resinous residue. This material was incorporated into rubber in accordance with the following formulae. Samples of the compounded rubber were vulcanized and tested for physical properties before and after ageing, yielding the results noted.

Formula A

| | Parts by weight |
|---|---|
| Extracted pale crepe | 100.0 |
| Zinc oxide | 5.0 |
| Sulfur | 3.0 |
| Hexamethylene tetramine | 1.0 |
| Stearic acid | 1.5 |
| Age resister | 1.0 |

Samples prepared from this formula were aged in a bomb for 6 days in an atmosphere of oxygen at 150 pounds pressure and at 50° C. The results of the test were as follows:

| Cure in min./°F. | Tens. | Elong. | Modulus | |
|---|---|---|---|---|
| | | | 500% | 700% |
| 35/285 | Kg./cm.² | Percent | | |
| Before | 112 | 775 | 20 | 70 |
| After | 116 | 750 | 23 | 85 |
| 50/285 | | | | |
| Before | 124 | 750 | 25 | 90 |
| After | 130 | 720 | 30 | 113 |
| 70/285 | | | | |
| Before | 137 | 720 | 34 | 130 |
| After | 134 | 685 | 37 | ------ |

Formula B

| | Parts by weight |
|---|---|
| Smoked sheet | 100.0 |
| Carbon black | 50.75 |
| Zinc oxide | 3.25 |
| Sulfur | 2.75 |
| Stearic acid | 3.50 |
| Pine tar | 3.00 |
| 2-mercaptobenzothiazole | 1.35 |
| Age resister | 1.00 |

Samples prepared from this formula were aged in a bomb for 7 hours under 80 pounds air pressure at 114° C. The results of the test were as follows:

| Cure in min./°F. | Tens. | Elong. | Modulus | |
|---|---|---|---|---|
| | | | 500% | 700% |
| 50/260 | Kg./cm.² | Percent | | |
| Before | 250 | 605 | 77 | 182 |
| After | 178 | 560 | 84 | 155 |
| 70/260 | | | | |
| Before | 312 | 640 | 99 | 220 |
| After | 184 | 540 | 95 | 168 |
| 100/260 | | | | |
| Before | 312 | 595 | 113 | 247 |
| After | 172 | 470 | 110 | ------ |
| 140/260 | | | | |
| Before | 310 | 580 | 126 | 259 |
| After | 176 | 465 | 114 | ------ |

It will be seen from these data, obtained by a standard accelerated ageing test, that the material is, as compared with other age resisters, very effective.

EXAMPLE 2

Fifty-two grams (0.264 mol) of diphenyl formamide and 400 cc. (5.46 mols) of acetone, with 5 grams of iodine as a catalyst, were charged into an autoclave and heated for 8 hours at 225° C. The water and excess acetone were than removed by distillation, after which the crude product was washed with dilute ammonium hydroxide and subjected to vacuum distillation at 8 mm. pressure to a vapor temperature of 185° C. This product was tested as an age resister as described in Example 1 yielding the following results:

In Formula A

| Cure in min./°F. | Tens. | Elong. | Modulus | |
|---|---|---|---|---|
| | | | 500% | 700% |
| 35/285. | $Kg./cm.^2$ | Percent | | |
| Before | 103 | 845 | 15 | 45 |
| After | 104 | 800 | 17 | 56 |
| 50/285. | | | | |
| Before | 114 | 790 | 20 | 68 |
| After | 112 | 775 | 22 | 80 |
| 70/285. | | | | |
| Before | 130 | 755 | 25 | 94 |
| After | 120 | 690 | 36 | |

In Formula B

| Cure in min./°F. | Tens. | Elong. | Modulus | |
|---|---|---|---|---|
| | | | 500% | 700% |
| 50/260. | $Kg./cm.^2$ | Percent | | |
| Before | 236 | 625 | 77 | 170 |
| After | 228 | 625 | 98 | 181 |
| 70/260. | | | | |
| Before | 280 | 625 | 98 | 204 |
| After | 242 | 600 | 116 | 204 |
| 100/260. | | | | |
| Before | 287 | 600 | 110 | 228 |
| After | 242 | 545 | 130 | 224 |
| 140/260. | | | | |
| Before | 280 | 560 | 125 | 245 |
| After | 246 | 515 | 148 | 242 |

EXAMPLE 3

Fifty grams of N-diphenyl acetamide (0.237 mol) and 300 grams (5.17 mols) of acetone, with 1 gram of iodine as a catalyst, were charged into an autoclave and heated for 7 hours at about 225° C. The water and excess acetone were than distilled off and the crude product was subjected to further distillation at 35–40 mm. pressure to a temperature of 200° C. in order to remove volatile materials. This product was tested as described in Example 1, yielding the following results:

In Formula A

| Cure in min./°F. | Tens. | Elong. | Modulus | |
|---|---|---|---|---|
| | | | 500% | 700% |
| 35/285. | $Kg./cm.^2$ | Percent | | |
| Before | 92 | 825 | 16 | 46 |
| After | 89 | 750 | 19 | 65 |
| 50/285. | | | | |
| Before | 115 | 800 | 20 | 62 |
| After | 118 | 750 | 22 | 84 |
| 70/285. | | | | |
| Before | 142 | 775 | 24 | 85 |
| After | 140 | 740 | 29 | 108 |

In Formula B

| Cure in min./°F. | Tens. | Elong. | Modulus | |
|---|---|---|---|---|
| | | | 500% | 700% |
| 50/260. | $Kg./cm.^2$ | Percent | | |
| Before | 262 | 645 | 70 | 117 |
| After | 214 | 580 | 93 | 182 |
| 70/260. | | | | |
| Before | 322 | 650 | 98 | 219 |
| After | 222 | 555 | 114 | 202 |
| 100/260. | | | | |
| Before | 318 | 600 | 114 | 249 |
| After | 192 | 465 | 120 | |
| 140/260. | | | | |
| Before | 318 | 565 | 126 | 270 |
| After | 212 | 465 | 136 | |

EXAMPLE 4

Mixed N-phenyl tolylamines prepared by reacting aniline and cresylic acid according to the description of U. S. Patent No. 2,094,263 were reacted with formic acid to produce the formamide of the cresylic acid-aniline reaction product. Ninety-seven grams of this amide and 300 grams of acetone, with one gram of iodine as a catalyst, were charged into an autoclave and heated for 7 hours at a temperature of 225° C. After removal of the excess acetone, other volatile products were removed by heating to 200° C. at 30–40 mm. pressure. The non-volatile residue was tested as described in Example 1, yielding the following results:

In Formula A

| Cure in min./°F. | Tens. | Elong. | Modulus | |
|---|---|---|---|---|
| | | | 500% | 700% |
| 35/285 | $Kg./cm.^2$ | Percent | | |
| Before | 90 | 805 | 16 | 48 |
| After | 100 | 775 | 18 | 63 |
| 50/285 | | | | |
| Before | 116 | 800 | 20 | 61 |
| After | 110 | 750 | 22 | 81 |
| 70/285 | | | | |
| Before | 136 | 760 | 26 | 93 |
| After | 120 | 715 | 30 | 112 |

In Formula B

| Cure in min./°F. | Tens. | Elong. | Modulus | |
|---|---|---|---|---|
| | | | 500% | 700% |
| 50/270 | $Kg./cm.^2$ | Percent | | |
| Before | 250 | 635 | 66 | 167 |
| After | 242 | 595 | 104 | 202 |
| 70/270 | | | | |
| Before | 312 | 640 | 94 | 218 |
| After | 232 | 530 | 116 | 219 |
| 100/270 | | | | |
| Before | 312 | 600 | 108 | 240 |
| After | 246 | 530 | 131 | 234 |
| 140/270 | | | | |
| Before | 318 | 585 | 122 | 260 |
| After | 244 | 480 | 147 | |

The test data shown in connection with the foregoing examples demonstrate that the age resisters of the invention are very effective materials, particularly in the high temperature test.

In preparing the age resisters, various other aryl amides may be employed in place of those shown in the specific examples. Such aryl amides may be prepared by well known processes by reacting a primary or secondary aryl amine with a carboxylic acid, with elimination of water. Any primary or secondary aryl amine may be employed. In addition to diaryl amines, the invention includes secondary N-aliphatic arylamines. Thus, the amines may be represented by the structural formula R—NH—R₁, in which R is aryl and R₁ is selected from the group consisting of hydrogen, aryl radicals and aliphatic radicals. Representative examples of suitable amines are aniline, the naphthylamines, the AR-tetrahydro-naphthylamines, N-cyclohexyl-β-naphthylamine, diphenylamine, phenyl-α-naphthylamine, phenyl-β-naphthylamine, N-methyl aniline and the like. In addition, the aryl groups may contain various nuclear substituents such as alkyl, aryl, aralkyl, alkoxy, aryloxy, etc. groups which are substantially inert in the subsequent reaction and do not destroy the age resisting properties of the final product. Also, the aliphatic groups may contain similar substituents without destroying the desired properties of the final product. Hydrocarbon radicals are preferred. Materials containing such substituents are equivalents of those derived from the arylamines and it is intended that they should be covered by the claims. Any carboxylic acid may be employed in preparing the aryl amides. Those in which the carboxylic radical is attached to a hydrocarbon group are preferred. The aliphatic acids are particularly useful and the lower aliphatic acids conforming to the structural formula R—COOH, in which R is hydrogen or an alkyl group containing one to three carbon atoms, constitute an especially preferred class. Representative acids are formic acid, propionic acid, acetic acid, butyric acid, lactic acid, crotonic acid, furoic acid, lauric acid, benzoic acid, naphthoic acid, etc.

Any ketone may be used in the reaction with the aryl amide, including both aliphatic and aromatic ketones, but those conforming to the formula R—CO—R, in which R is hydrocarbon, are preferred. The aliphatic ketones are particularly useful. Here and elsewhere in the specification and the claims the term "aliphatic" includes saturated and unsaturated, straight chain, branched chain and cyclic radicals and ring-substituted aliphatic radicals, such as aralkyl, furfuryl, tetrahydrofurfuryl and like groups. Representative examples of suitable ketones are acetone, methyl ethyl ketone, diethyl ketone, methyl hexyl ketone, dibutyl ketone, mesityl oxide, diacetone alcohol, phorone, isophorone, acetyl acetone, acetonyl acetone, benzyl ethyl ketone, etc.

The proportions of ketone and aryl amide employed are not critical. In practice, as demonstrated in Examples 1 to 4, it is satisfactory and convenient to employ a substantial excess of the ketone, which acts as a solvent and renders the reactant mass fluid during the reaction. An excess of either reactant merely passes through to the product as an impurity which can be removed, if desired. The temperature is not critical and may be varied over a wide range. In general, temperatures from 150–300° C. are satisfactory and convenient but any other temperature at which the ketone and arylamide will condense, with splitting out of water, may be employed. Any other acidic condensation catalyst may be used in place of the iodine of the specific examples. Such catalysts are well known in the art, further examples being hydrogen chloride, hydrogen bromide, and zinc chloride.

While there have been described above certain preferred embodiments of the invention, the same is not limited thereto but only by the appended claims wherein it is intended to set forth all features of patentable novelty residing in the invention.

I claim:

1. A method of treating rubber which comprises vulcanizing the same in the presence of the product obtained by reacting an aryl amide with a ketone at a temperature of about 150–300° C. and with the elimination of water.

2. A method of treating rubber which comprises vulcanizing the same in the presence of the product obtained by reacting an aryl amide with a ketone in the presence of an acid condensation catalyst and at a temperature of about 150–300° C. and with the elimination of water.

3. A method of treating rubber which comprises vulcanizing the same in the presence of the product obtained by reacting an aryl amide with an aliphatic ketone at a temperature of about 150–300° C. and with the elimination of water.

4. A rubber product which has been vulcanized in the presence of the product obtained by reacting an aryl amide with a ketone at a temperature of about 150–300° C. and with the elimination of water.

5. A rubber product which has been vulcanized in the presence of the product obtained by reacting an aryl amide with a ketone in the presence of an acid condensation catalyst and at a temperature of about 150–300° C. and with the elimination of water.

6. A rubber product which has been vulcanized in the presence of the product obtained by reacting an aryl amide with an aliphatic ketone at a temperature of about 150–300° C. and with the elimination of water.

WINFIELD SCOTT.